United States Patent
Balasubramanian et al.

(10) Patent No.: US 10,349,302 B2
(45) Date of Patent: *Jul. 9, 2019

(54) RATE ADAPTATION USING NETWORK SIGNALING

(71) Applicant: VID SCALE, INC., Wilmington, DE (US)

(72) Inventors: Anantharaman Balasubramanian, San Diego, CA (US); Gregory S. Sternberg, Mt. Laurel, NJ (US); Liangping Ma, San Diego, CA (US); Samian Kaur, Plymouth Meeting, PA (US); Yuriy Reznik, Seattle, WA (US); Avi Rapaport, Shoham (IL); Weimin Liu, Chatham, NJ (US); Eduardo Asbun, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/415,873

(22) Filed: Jan. 26, 2017

(65) Prior Publication Data

US 2017/0142609 A1 May 18, 2017

Related U.S. Application Data

(63) Continuation of application No. 13/959,348, filed on Aug. 5, 2013, now Pat. No. 9,591,513.

(Continued)

(51) Int. Cl.
*H04W 28/02* (2009.01)
*H04L 12/811* (2013.01)
(Continued)

(52) U.S. Cl.
CPC ......... *H04W 28/0231* (2013.01); *H04L 47/26* (2013.01); *H04L 47/38* (2013.01);
(Continued)

(58) Field of Classification Search
None
See application file for complete search history.

(56) References Cited

U.S. PATENT DOCUMENTS 8,203,940 B1 * 6/2012 Yuan ..................... H04L 1/0002
370/229
8,565,081 B1 10/2013 Yuan et al.
(Continued)

OTHER PUBLICATIONS

3rd Generation Partnership Project (3GPP), TS 26.114 V11.4.0, "Technical Specification Group Services and System Aspects, IP Multimedia Subsystem (IMS), Multimedia Telephony, Media Handling and Interaction (Release 11)", Jun. 2012, pp. 1-263.

(Continued)

*Primary Examiner* — Chi H Pham
*Assistant Examiner* — Vladislav Y Agureyev
(74) *Attorney, Agent, or Firm* — Condo Roccia Koptiw LLP

(57) ABSTRACT

Systems, methods, and instrumentalities are disclosed to perform rate adaptation in a wireless transmit/receive unit (WTRU). The WTRU may receive an encoded data stream, which may be encoded according to a Dynamic Adaptive HTTP Streaming (DASH) standard. The WTRU may request and/or receive the data stream from a content server. The WTRU may monitor and/or receive a cross-layer parameter, such as a physical layer parameter, a RRC layer parameter, and/or a MAC layer parameter (e.g., a CQI, a PRB allocation, a MRM, or the like). The WTRU may perform rate adaption based on the cross-layer parameter. For example, the WTRU may set the CE bit of an Explicit Congestion Notification (ECN) field based on the cross-
(Continued)

layer parameter. The WTRU may determine to request the data stream encoded at a different rate based on the cross-layer parameter, the CE bit, and/or a prediction based on the cross-layer parameter.

26 Claims, 16 Drawing Sheets

Related U.S. Application Data

(60) Provisional application No. 61/680,206, filed on Aug. 6, 2012.

(51) Int. Cl.
*H04L 12/825* (2013.01)
*H04L 29/06* (2006.01)
*H04L 29/08* (2006.01)

(52) U.S. Cl.
CPC ...... *H04L 65/4084* (2013.01); *H04L 65/4092* (2013.01); *H04L 65/80* (2013.01); *H04L 67/02* (2013.01)

(56) References Cited

U.S. PATENT DOCUMENTS

| | | | |
|---|---|---|---|
| 2008/0095185 | A1 | 4/2008 | DiGirolamo et al. |
| 2009/0161545 | A1* | 6/2009 | Ho ................. H04L 47/225 370/235 |
| 2010/0121977 | A1 | 5/2010 | Kontola et al. |
| 2010/0195521 | A1 | 8/2010 | Wanstedt et al. |
| 2010/0238805 | A1 | 9/2010 | Ludwig et al. |
| 2011/0075563 | A1 | 3/2011 | Leung et al. |
| 2011/0170408 | A1 | 7/2011 | Furbeck et al. |
| 2011/0261695 | A1 | 10/2011 | Zhao et al. |
| 2012/0047230 | A1 | 2/2012 | Begen et al. |
| 2012/0069927 | A1 | 3/2012 | Oyman et al. |
| 2012/0087245 | A1 | 4/2012 | Leung |
| 2012/0147750 | A1 | 6/2012 | Pelletier et al. |
| 2012/0155398 | A1* | 6/2012 | Oyman ................. H04W 28/24 370/329 |
| 2012/0269153 | A1 | 10/2012 | Seo et al. |
| 2013/0022008 | A1* | 1/2013 | Berggren ................. H04L 5/001 370/329 |
| 2013/0060911 | A1* | 3/2013 | Nagaraj ......... H04N 21/234327 709/219 |
| 2013/0083656 | A1 | 4/2013 | Wigell |
| 2013/0194937 | A1 | 8/2013 | Sridhar et al. |
| 2013/0286867 | A1* | 10/2013 | Davydov .............. H04W 24/06 370/252 |
| 2013/0286868 | A1 | 10/2013 | Oyman et al. |
| 2013/0298170 | A1 | 11/2013 | ElArabawy et al. |

OTHER PUBLICATIONS

3rd Generation Partnership Project (3GPP), TS 26.234 V10.2.0, "Technical Specification Group Services and System Aspects, Transparent End-to-End Packet-Switched Streaming Service (PSS), Protocols and Codecs (Release 10)", Sep. 2011, pp. 1-168.

3rd Generation Partnership Project (3GPP), TS 26.244 V10.1.0, "Technical Specification Group Services and System Aspects, Transparent End-to-End Packet Switched Streaming Service (PSS), 3GPP File Format (3GP) (Release 10)", Jun. 2011, pp. 1-57.

3rd Generation Partnership Project (3GPP), TS 26.247 V10.1.0, "Technical Specification Group Services and System Aspects, Transparent End-to-End Packet-Switched Streaming Service (PSS), Progressive Download and Dynamic Adaptive Streaming over HTTP (3GP-DASH) (Release 10)", Nov. 2011, pp. 1-111.

Conklin et al., "Video Coding for Streaming Media Delivery on the Internet", IEEE Transactions on Circuits and Systems for Video Technology, vol. 11, No. 3, Mar. 2001, pp. 269-281.

ISO/IEC, "Information Technology-Coding of Audio-Visual Objects—Part 12: ISO Base Media File Format, Amendment 3: DASH Support and RTP Reception Hint Track Processing", ISO/IEC JTC 1/SC 29, Aug. 17, 2011, 44 pages.

ISO/IEC, "Information Technology-Dynamic Adaptive Streaming Over HTTP (DASH)—Part 1: Media Presentation Description and Segment Formats", ISO/IEC JTC 1/SC 29, Jan. 5, 2012, 133 pages.

Oyman et al., "Quality of Experience for HTTP Adaptive Streaming Services", IEEE Communications Magazine, Apr. 2012, pp. 20-27.

\* cited by examiner

RATE ADAPTATION USING NETWORK SIGNALING

CROSS-REFERENCE TO RELATED APPLICATIONS

This application is a continuation of U.S. Non-Provisional patent application Ser. No. 13/959,348, filed Aug. 5, 2013, which claims the benefit of U.S. Provisional Patent Application No. 61/680,206, filed Aug. 6, 2012, which are all hereby incorporated by reference as if fully set forth herein, for all purposes.

BACKGROUND

MPEG/3GPP Dynamic Adaptive HTTP Streaming (DASH) standard may define a framework for design of bandwidth-adaptive delivery of streaming content over wireless and wired networks. DASH may be a pull-based streaming paradigm where the client may play a central role in carrying the intelligence that drives the video adaptation.

SUMMARY

A wireless transmit/receive unit (WTRU) may perform rate adaptation. The WTRU may include an adaptive bitrate client, such as a DASH client, for example, residing at the application layer of the WTRU. The WTRU may receive an encoded data stream. The data stream may be a video stream, for example. The data stream may be a multi-rate encoded data stream. For example, the data stream may be encoded according to a Dynamic Adaptive HTTP Streaming (DASH) standard. The WTRU may request and/or receive the data stream encoded at a first rate. For example, the WTRU may request and/or receive (e.g., indirectly receive) the data stream from a content server, such as a HTTP content server, or the like.

The WTRU may perform rate adaption, for example, according to a cross-layer parameter and/or a congestion encountered (CE) bit. Rate adaption may be performed at the application layer of the WTRU. For example, rate adaption may include requesting the data stream encoded at a different rate, issuing TCP reset associated with the data stream, and/or aborting an HTTP request for the data stream.

The WTRU may monitor and/or receive a cross-layer parameter. A cross-layer parameter may be any parameters (e.g., signaling) that is available at a layer of a WTRU and/or directed to a layer of the WTRU other than the application layer. For example, the cross-layer parameter may be a physical layer parameter, a RRC layer parameter, and/or a MAC layer parameter. For example, the cross-layer parameters may be a CQI, a PRB allocation, a MRM, or the like.

The WTRU may perform rate adaption based on the cross-layer parameter. For example, the WTRU may set the CE bit of an Explicit Congestion Notification (ECN) field based on the cross-layer parameter. The WTRU may set and/or receive a CE bit of an ECN field based on the cross-layer parameter. The WTRU may predict and/or estimate one or more of network congestion, throughout of the communication channel, a cell change event (e.g., a mobility event), and/or a channel condition that indicates loss of throughput using the cross-layer parameter. For example, the WTRU may determine to request the data stream encoded at a second rate based on one or more of the cross-layer parameter, the CE bit, and/or the prediction based on the cross-layer parameter. The second rate may be lower than the first rate or the second rate may be higher than the first rate. The WTRU may receive the data stream encoded at the second rate.

The WTRU may receive a congestion encountered (CE) bit. The CE bit may be part of an ECN field. The ECN field may be received from a network element, such as a router, eNodeB, gateway, or the like. The WTRU may receive the CE bit upon a network element detecting one or more of a congestion scenario, a cell change event (e.g., a mobility event), and/or a channel condition that indicates loss of throughput. The WTRU may determine to request the data stream encoded at a different rate based on the CE bit.

The WTRU may monitor a PDCCH and determine a physical layer parameter based on the PDCCH. For example, the physical layer parameter may include a CQI, a PRB allocation, or the like. The WTRU may determine to request the data stream encoded at a different rate based on the physical layer parameter. For example, the WTRU may set the CE bit of an ECN field based on the physical layer parameters, and determine to request the data stream encoded at the different rate based on the CE bit. The WTRU may request and/or receive the data stream encoded at a different rate based on the CE bit.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
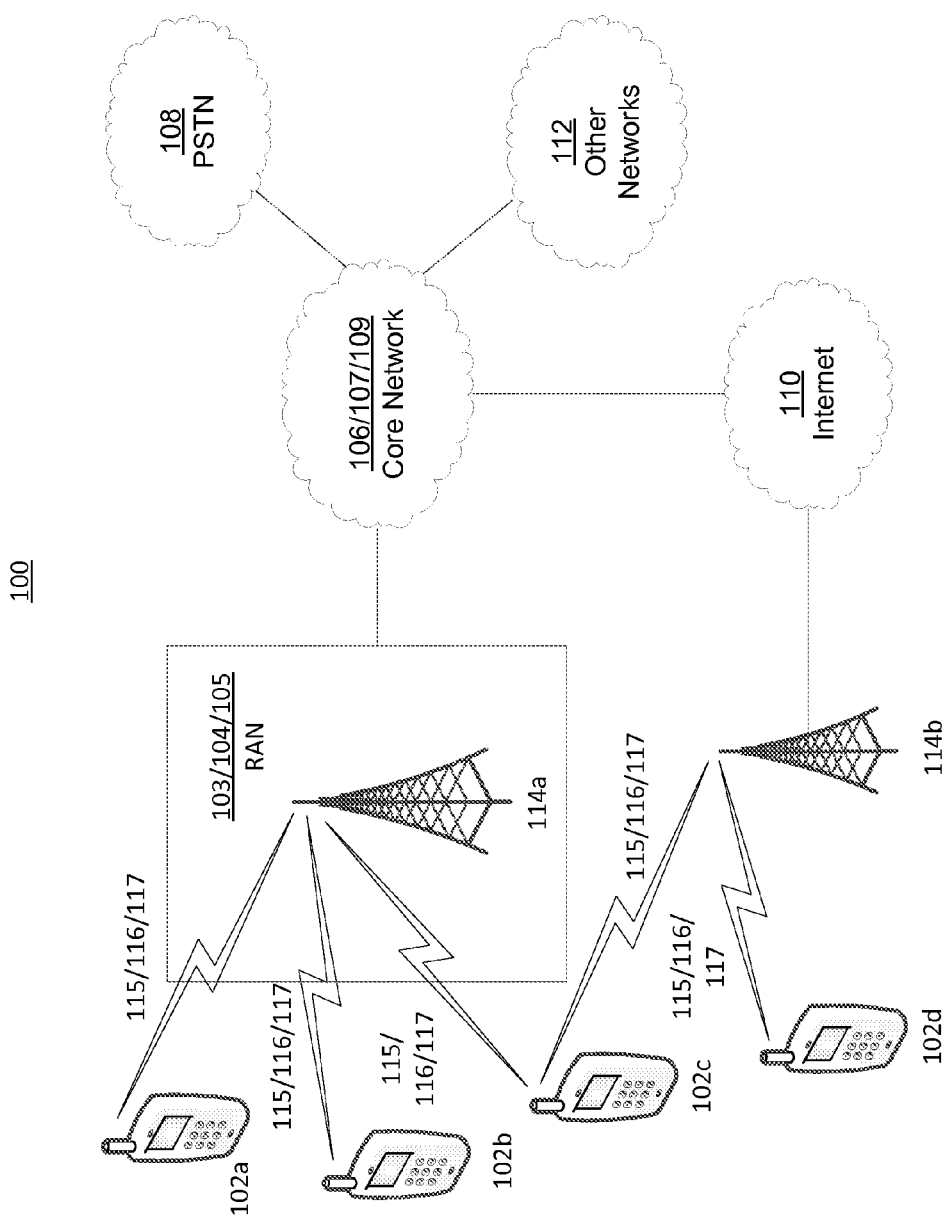
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA±). HSPA may include High-Speed Downlink Packet Access (HSDPA) and/or High-Speed Uplink Packet Access (HSDPA).

In another embodiment, the base station 114a and the WTRUs 102a, 102b, 102c may implement a radio technology such as Evolved UNITS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
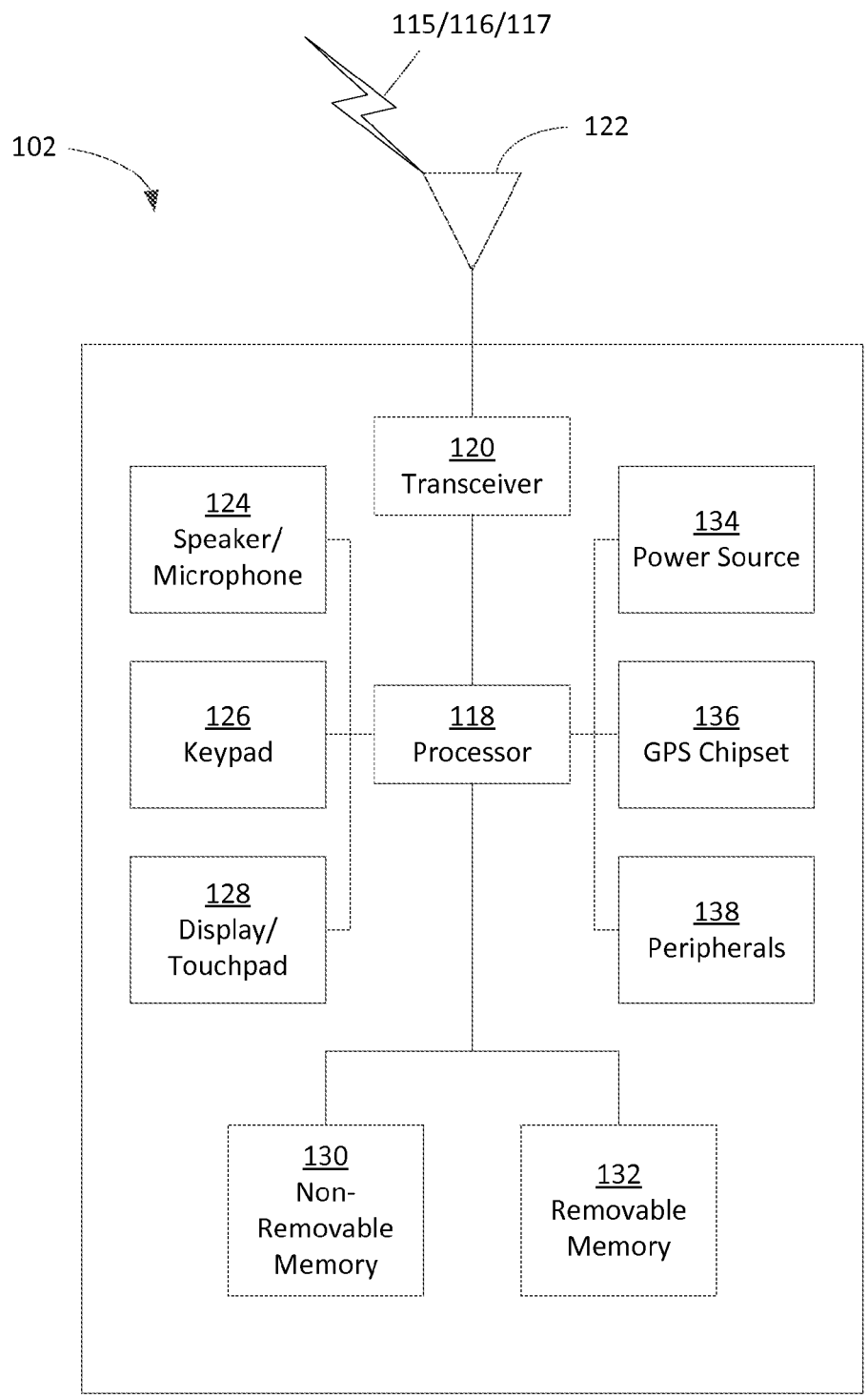
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
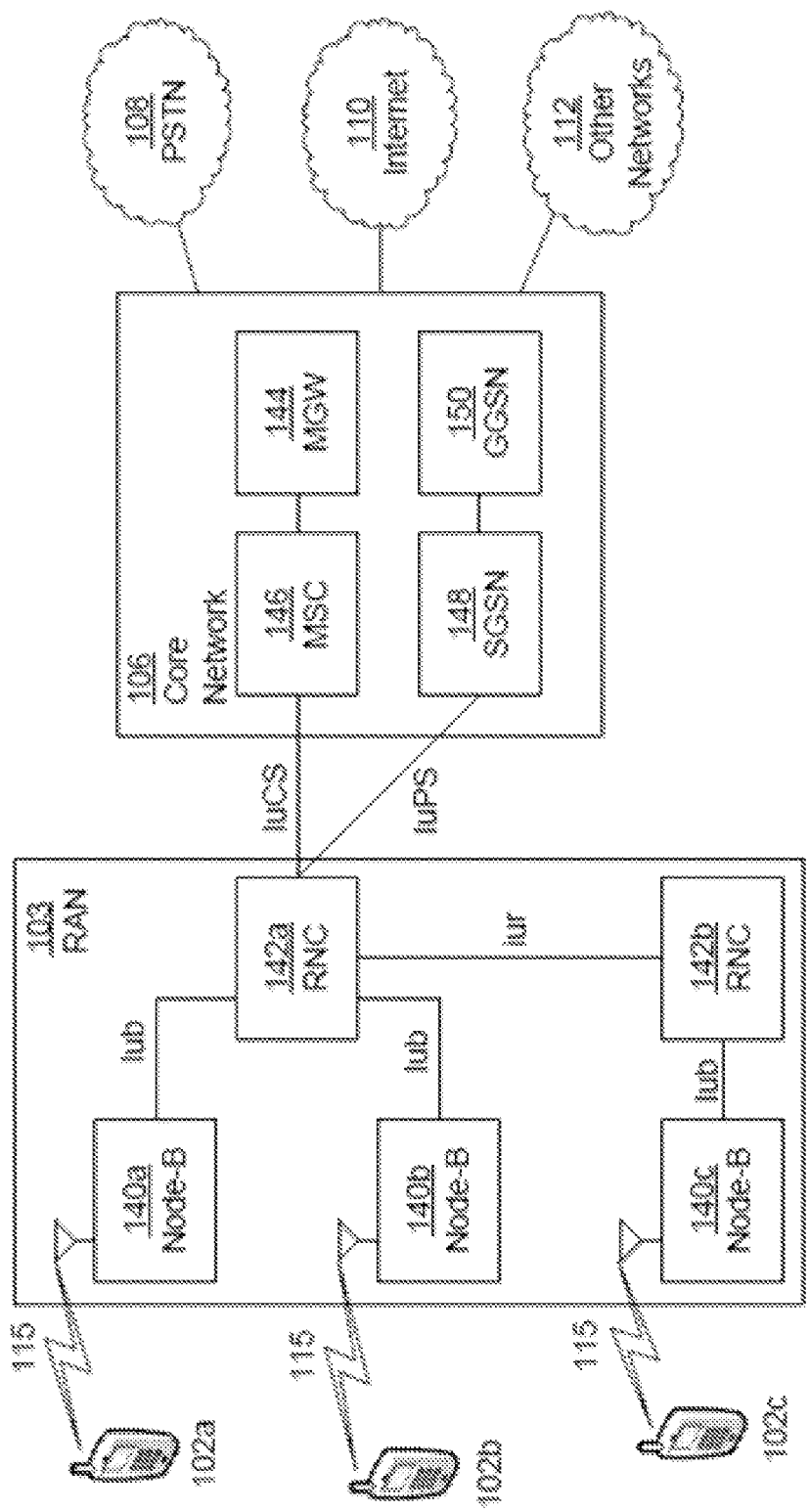
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
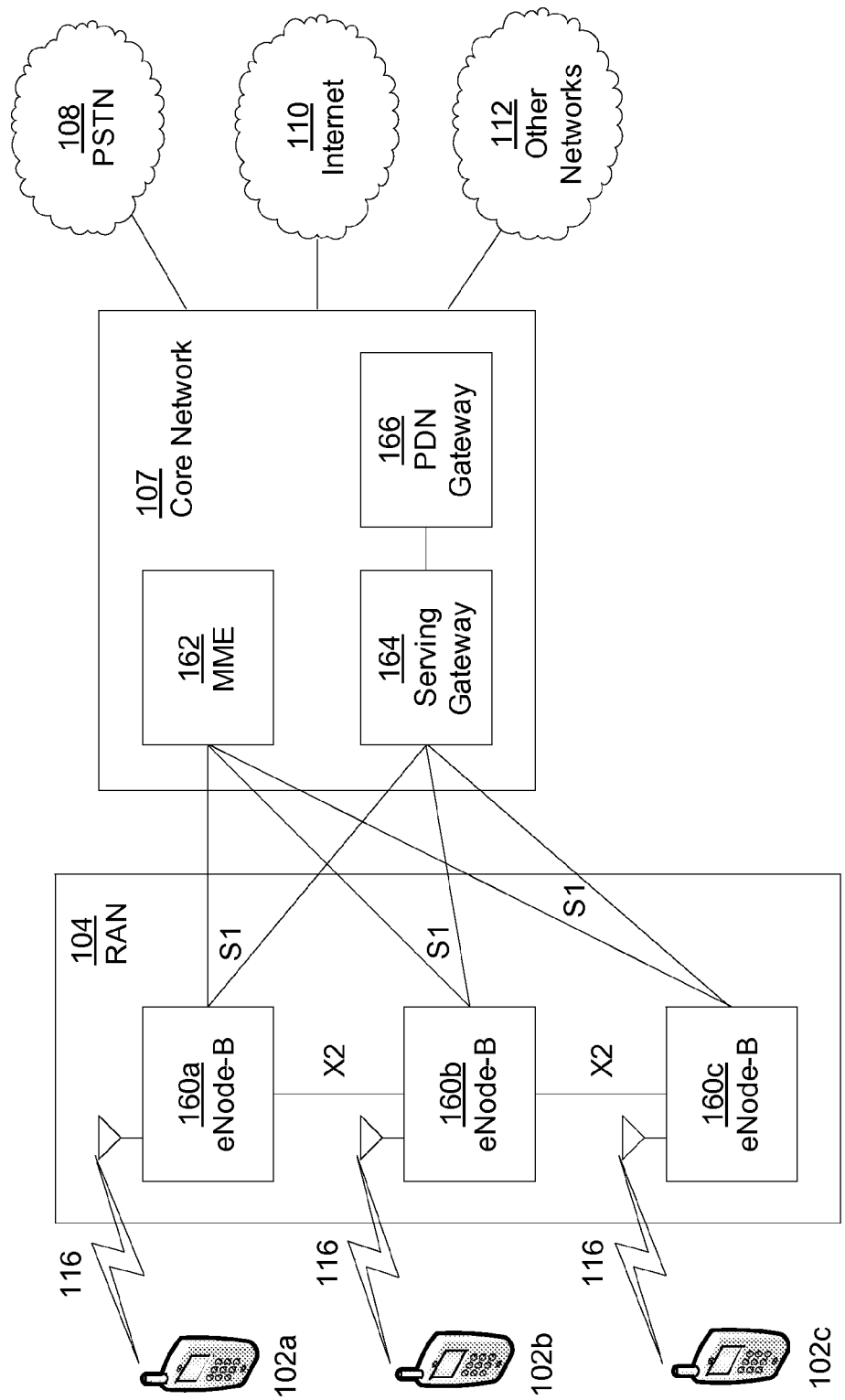
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
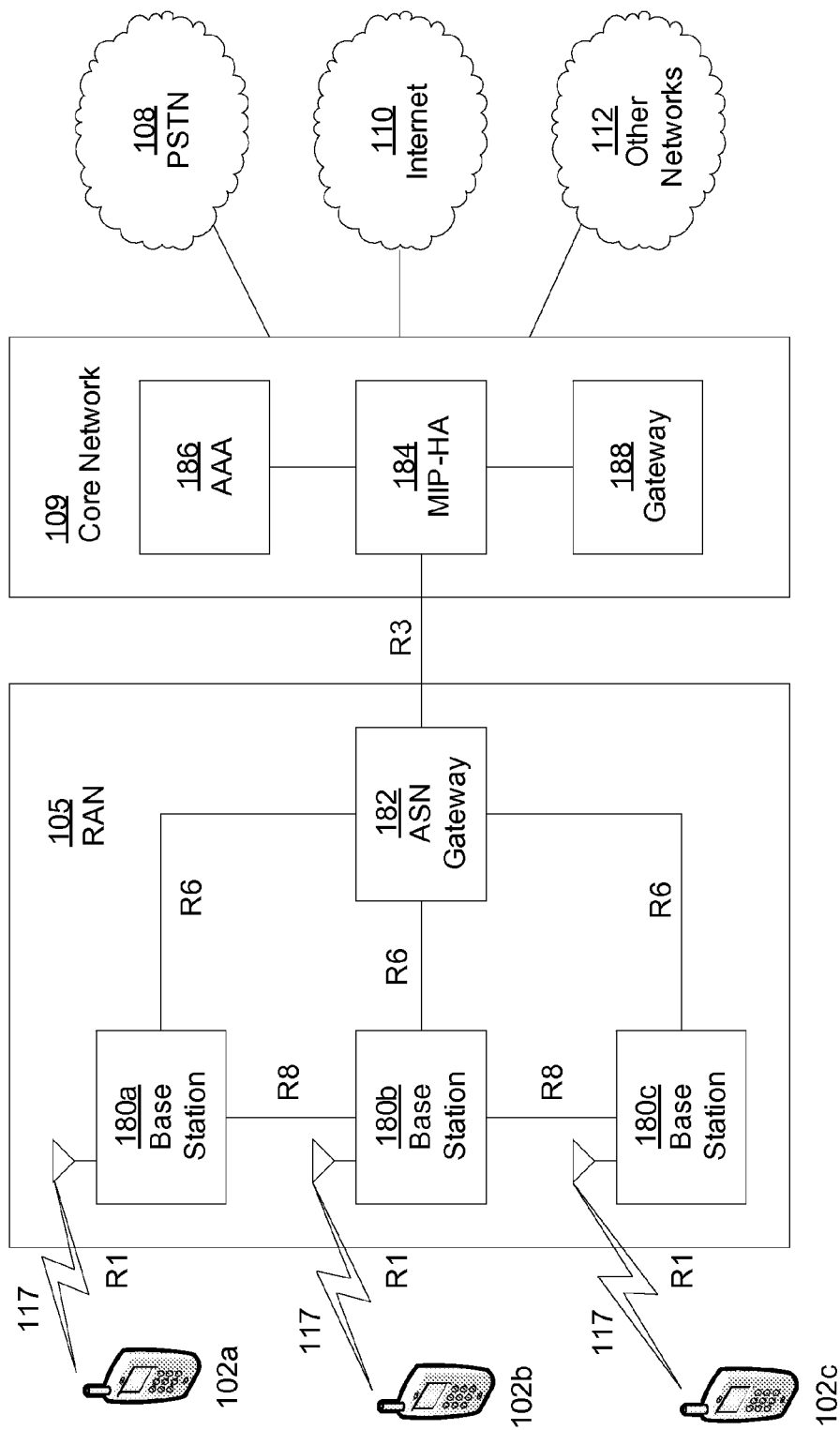
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Rate adaptation (e.g., DASH rate adaptation), for example, rate adaption controlled by a WTRU may be provided. Rate adaptation may be enabled using network signaling. Cross layer signaling in the WTRU may be provided to enable rate adaptation. For example, a DASH client in a WTRU may be informed of the congestion level of the network and the state of wireless channel. The client may use this information to perform network rate adaptation, which may improve, for example, the user's Quality of Experience (QoE). For example, the client may receive an indication of rate and/or latency changes earlier than the client may by monitoring transport layer statistics.

A client may be provided with some or all of the intelligence relating to rate adaption, for example, in a pull-based streaming paradigm. The client may be expected to estimate the available network bandwidth. The client may request media segments encoded at appropriate rates, for example, according to the available network bandwidth. The client's ability to estimate bandwidth may be enhanced if the client obtains access to lower level signaling (e.g., transport level signaling, RRC level signaling, etc.) and/or to events that happen within the access network.

A QoE monitoring and reporting framework of DASH may be provided. DASH may rely on channel bandwidth estimation to be able to accomplish video rate adaptation. Such bandwidth estimation may be enhanced by the signaling from lower layers (e.g., the transport layer, RRC layer, physical layer, etc.).

A client may be informed of access network events through signaling from the network. A client may estimate and/or infer network conditions via cross-layer mechanisms. A client may detect network events, for example, such as but not limited to congestion, mobility (e.g., inter-RAT, intra-RAT handovers), changes in state of a wireless channel, abrupt changes in received signal power, and/or the like.

A network element (e.g., an eNodeB) may indicate network congestion to the client using signaling (e.g., explicit signaling). For example, Explicit Congestion Notification (ECN) may be utilized to inform the client of network congestion. ECN may be an extension to TCP/IP that may be used for signaling congestion without dropping packets. ECN may be used when the endpoints support the use of ECN. ECN may be effective when supported by the underlying network. For example, when an eNodeB detects a congestion scenario, ECN may set a Congestion Encountered (CE) flag bit and send it to a WTRU. Upon receiving the packet, the WTRU may detect the presence of the CE flag for client rate adaptation. The ECN feature may mandate the receiver to notify the sender of the congestion scenario. The ECN feature may not mandate the receiver to inform the sender, for example, because the rate adaptation mechanism may reside in the WTRU. The DASH protocol may include guidelines for the processing of ECN bits in the DASH client, for example, such as to modify (e.g., increase or decrease) the requested rate, issue a TCP reset, abort the HTTP request, etc.

Cross-layer signaling may be utilized by a WTRU, for example, to infer congestion, mobility events, and/or the state of the wireless channel. Cross-layer signaling may refer to signaling that occurs at layers other than the application layer. For example, from the perspective of a DASH client, the cross-layer signaling may be information that may be available in layers other than the application layer. Cross-layer signaling may be leveraged to predict the occurrence of certain events, for example, such as, but not limited to network congestion and/or a change in state of a wireless channel that may occur due to mobility or handovers for client rate adaptation. For example, physical layer signaling parameters such as, but not limited to Channel Quality Indicator (CQI), physical resource blocks (PRB) allocation, and/or RRC signaling may be used to predict the occurrence of certain events, for example, before they actually occur. Physical layer signaling parameters may enable rate adaptation by the client.

The cross layer parameters that may be used by the client may be WTRU specific. For example, it may not be necessary to perform cross layer signaling within the WTRU for rate adaptation. The WTRU may be made to internally set the ECN bit, for example, if the WTRU infers of a network congestion situation by means other than eNodeB signaling. The DASH client may include guidelines for the processing of cross-layer signaling in the DASH client, for example, to lower the requested rate, issue a TCP reset, abort the HTTP request, etc. For video telephony, IMS may specify the handling of the ECN bit. For networks which do not support the ECN bit, cross-layer signaling in the WTRU indicating network conditions may be used for rate adaptation.

One or more embodiments described herein may relate to, for example, packet-loss detection and prevention of loss propagation in wireless video telephony, smooth stream switching for MPEG/3GPP DASH, multi-hypothesis rate adaptation for a DASH-client, and/or architecture of a DASH streaming client.

Figure 2:
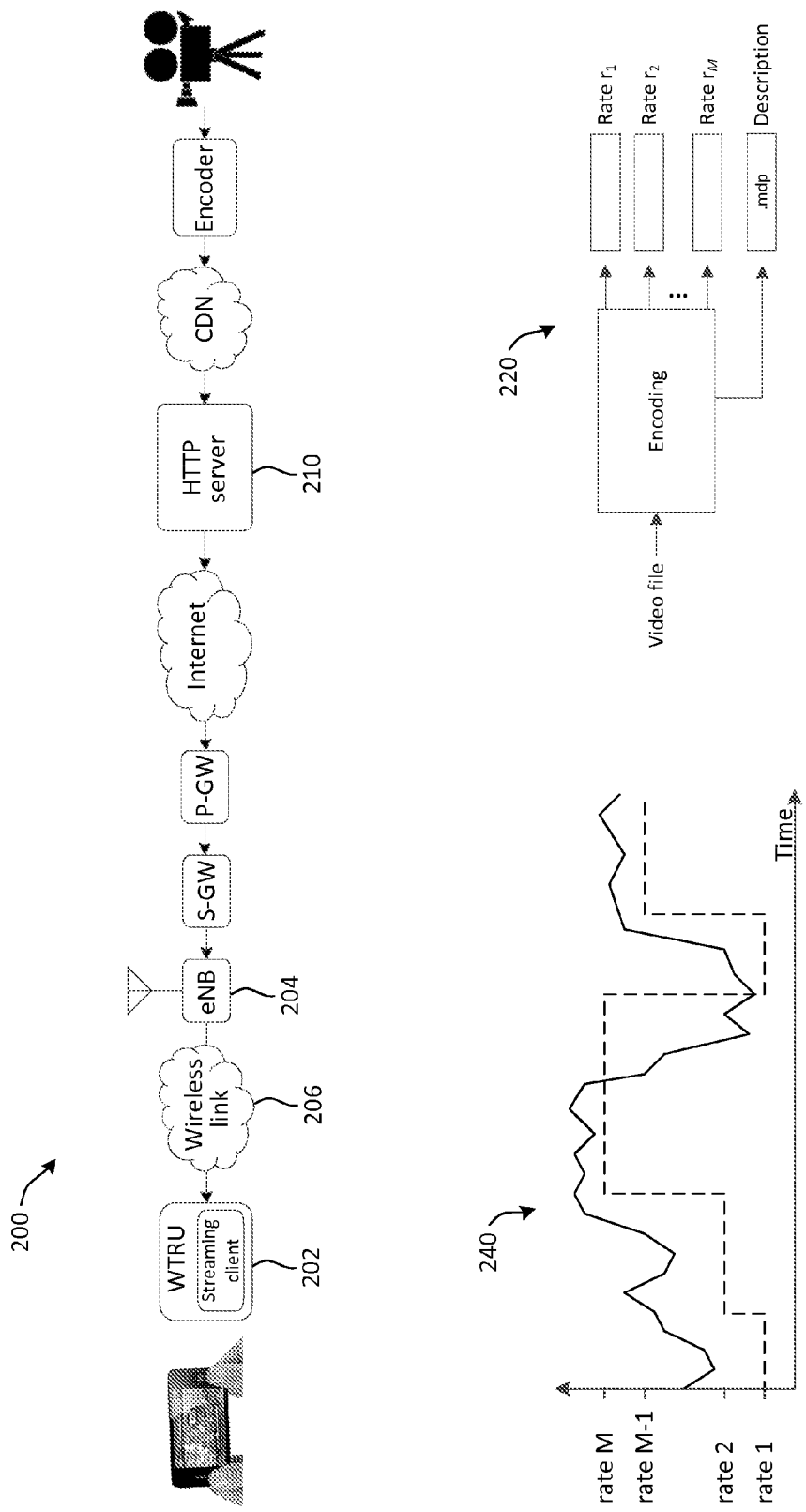
FIG. 2 is a diagram that illustrates an example of a wireless system with a DASH streaming client.

FIG. 2 is a diagram that illustrates an example of a wireless system with a DASH streaming client. In the example system 200, a WTRU 202 may stream multimedia data serviced by a network element (e.g., an eNodeB (eNB) 204) over an air interface 206. Multimedia content may be encoded at different rates, for example, as illustrated in block diagram 220. The multimedia content may reside in the HTTP server 210. The WTRU 202 may include a pull-based video streaming client. For example, the WTRU 202 may include a DASH client. The WTRU 202 may play a central role in rate adaptation. For example, the WTRU 202 may estimate and/or predict the available bandwidth of the communication channel. The WTRU may request media segments encoded at data rates according to the estimated and/or predicted communication channel. For example, graph 240 illustrates an example of a WTRU requesting media segments encoded at different data rates based on changing channel conditions. The client may determine one or more conditions associated with the access network, for example, the congestion of the network, mobility events, and/or the state of the wireless channel. For example, the WTRU 202 may receive signaling from other layers relating to network events and/or conditions associated with the communication channel. The WTRU may estimate and/or predict network events and/or conditions associated with the communication channel. The client request and/or receive (e.g., stream) video at a rate that is commensurate with what the channel is expected and/or predicted to support.

The potential impact on throughput and latency of congestion in the access network, mobility events, and/or the state of the wireless channel may be signaled to a client, for example, before the client application would be able to discover them on its own by monitoring transport layer statistics. Early indications of rate or latency changes may provide a better QoE.

DASH rate adaptation may be described herein. For example, a network element (e.g., an eNodeB) may signal a congestion encountered situation by setting the Congestion Encountered (CE) bit, which may be part of the ECN field. The network element may send the ECN field including the CE bit to a WTRU. The WTRU may use the presence of CE bit information for DASH rate adaptation, for example, as described herein.

Cross-layer parameter(s) may be utilized by a WTRU for rate adaption. For example, congestion, mobility, and/or the state of the wireless channel may be inferred using one or more cross-layer parameters (e.g., physical layer parameters, RRC layer parameters, MAC layer parameters, etc.). One or more cross-layer parameters may be utilized with the amount of requested data that the WTRU (e.g., DASH client) has not yet received. For example, the amount of requested data that the WTRU has not received may be used by the WTRU as a cue to estimate the channel conditions. The WTRU may identify statistics associated with the amount of data received and requested by the WTRU to estimate the channel conditions. RRC signaling may be leveraged by a WTRU for DASH rate adaptation. Cross-layer signaling may be used for IMS based video telephony rate adaptation in networks which do not support explicit ECN signaling.

Network signaling using the Explicit Congestion Notification (ECN) field may be provided. The ECN field may be an element of TCP/IP that may be used for signaling congestion without dropping packets. The ECN field may be used when the endpoints support and/or use it. The ECN field may be effective when supported by the underlying network. The use of the ECN field may allow the WTRU to not have to echo back the congestion indication to the sender.

Figure 3A:
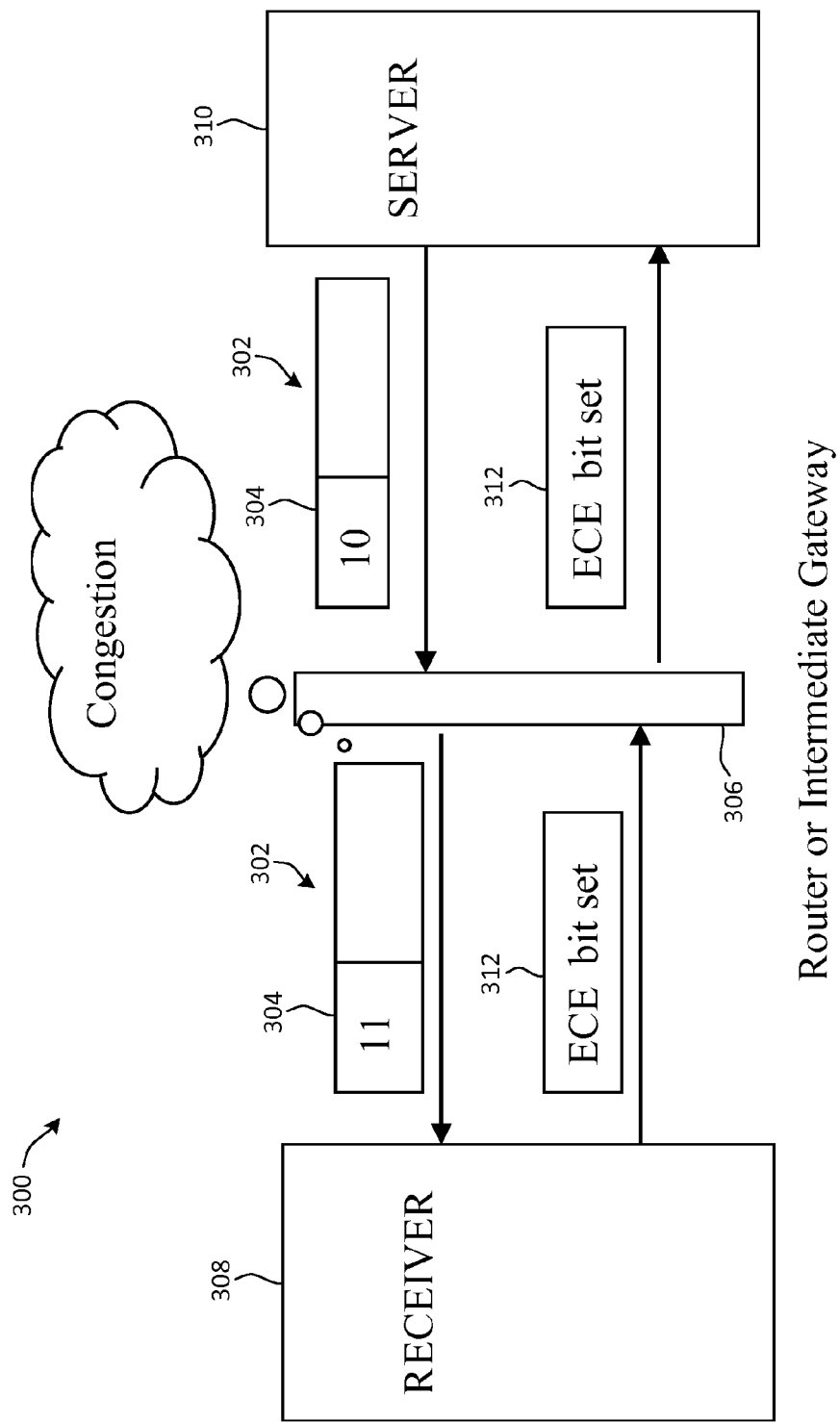
FIG. 3A is a diagram illustrating an example method of Explicit Congestion Notification (ECN) usage where an IP packet may be transmitted from a network element.
Figure 3B:
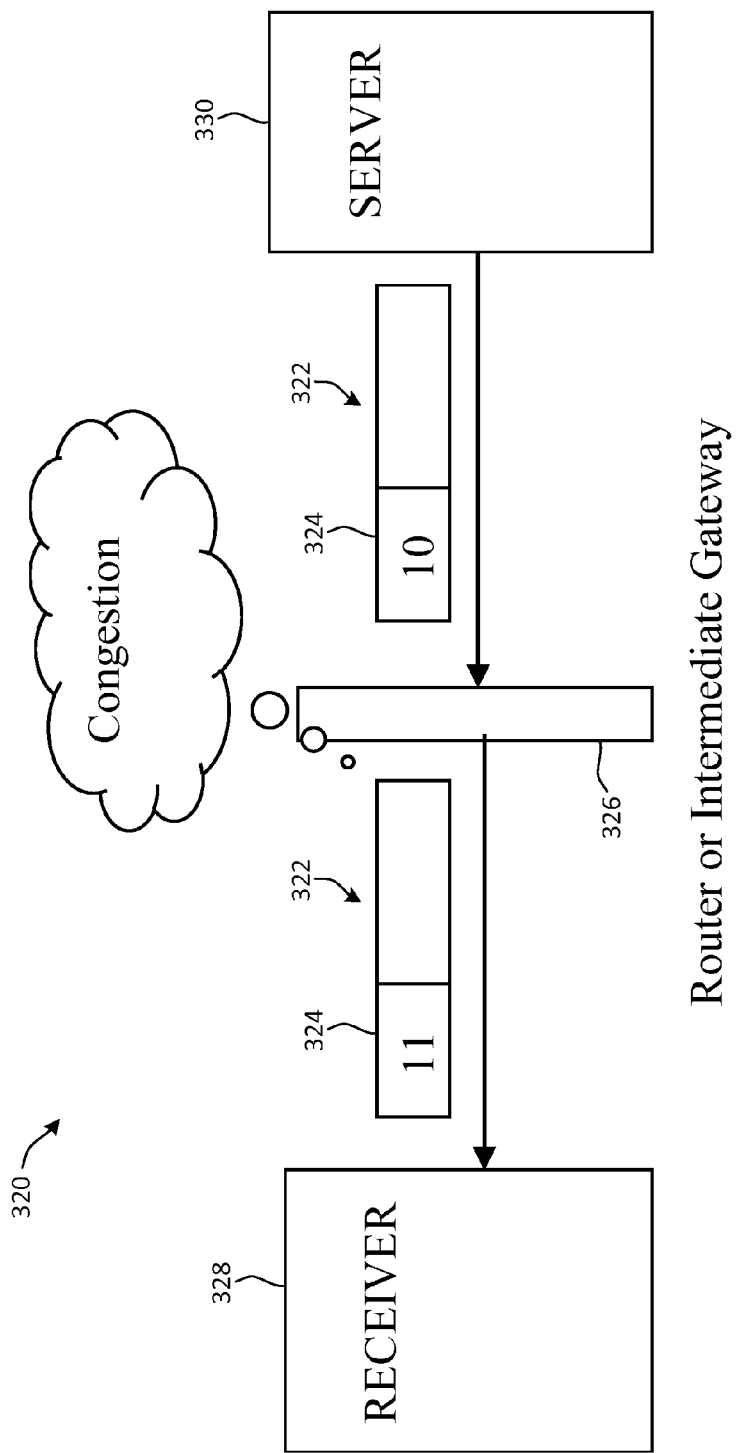
FIG. 3B is a diagram illustrating an example method of ECN usage for DASH.

FIGS. 3A-B are diagrams illustrating example methods of ECN usage. FIG. 3A is a diagram illustrating an example method of ECN usage where an IP packet may be transmitted from a network element (e.g., a server). In diagram 300, the IP packet 302 may initially have an ECN flag 304 set to 10. This may mean that it is an ECN capable transport. When the packet reaches a router or intermediate gateway 306, the packet 302 may encounter congestion and the ECN flag 304 may be set to 11. This may mean that congestion may have been encountered. When congestion is encountered, the CE bit may be set to 1. Upon receiving the IP packet 302 with the CE bit, the receiver 308 (e.g., WTRU, the DASH client, etc.) may echo back the congestion indication to the sender (e.g., the server 310) with the ECN-Echo (ECE) bit set 312.

FIG. 3B is a diagram illustrating an example method for ECN usage. For example, as shown in diagram 320, rate adaptation may be performed at a receiver 328, for example, a WTRU (e.g., a DASH client residing on a WTRU). Since rate adaptation may be performed at the receiver (e.g., the client), there may be no need to send the ECN-Echo (ECE) indication back to the sender. The receiver 328 may perform rate adaption upon receiving the ECN field 324 (e.g., with the CE bit set to 1) of the IP packet 322 from the sender (e.g., server 330), for example, via a router or intermediate gateway 326.

The ECN flag may be used by the client for rate adaption. For example, when a network element (e.g., an eNodeB, router, etc.) detects a congestion situation, the network element may set the CE bit and may transmit the CE bit to the W1'RU. Mobility events and/or channel conditions may indicate loss (e.g., incipient loss) of throughput. The network element may detect the presence of congestion and/or send the ECN field with the CE bit set to the WTRU. For example, a network element may detect the presence of congestion due in part to a number of WTRUs that the network element is serving, and/or the buffer occupancy and/or QoS that the network element may meet (e.g., simultaneously meet) for the WTRUs. The WTRU may perform rate adaption upon receiving a packet with the CE bit set. For example, the WTRU may pass the CE bit to a rate adaptation module of a DASH client residing on the WTRU.

Figure 4:
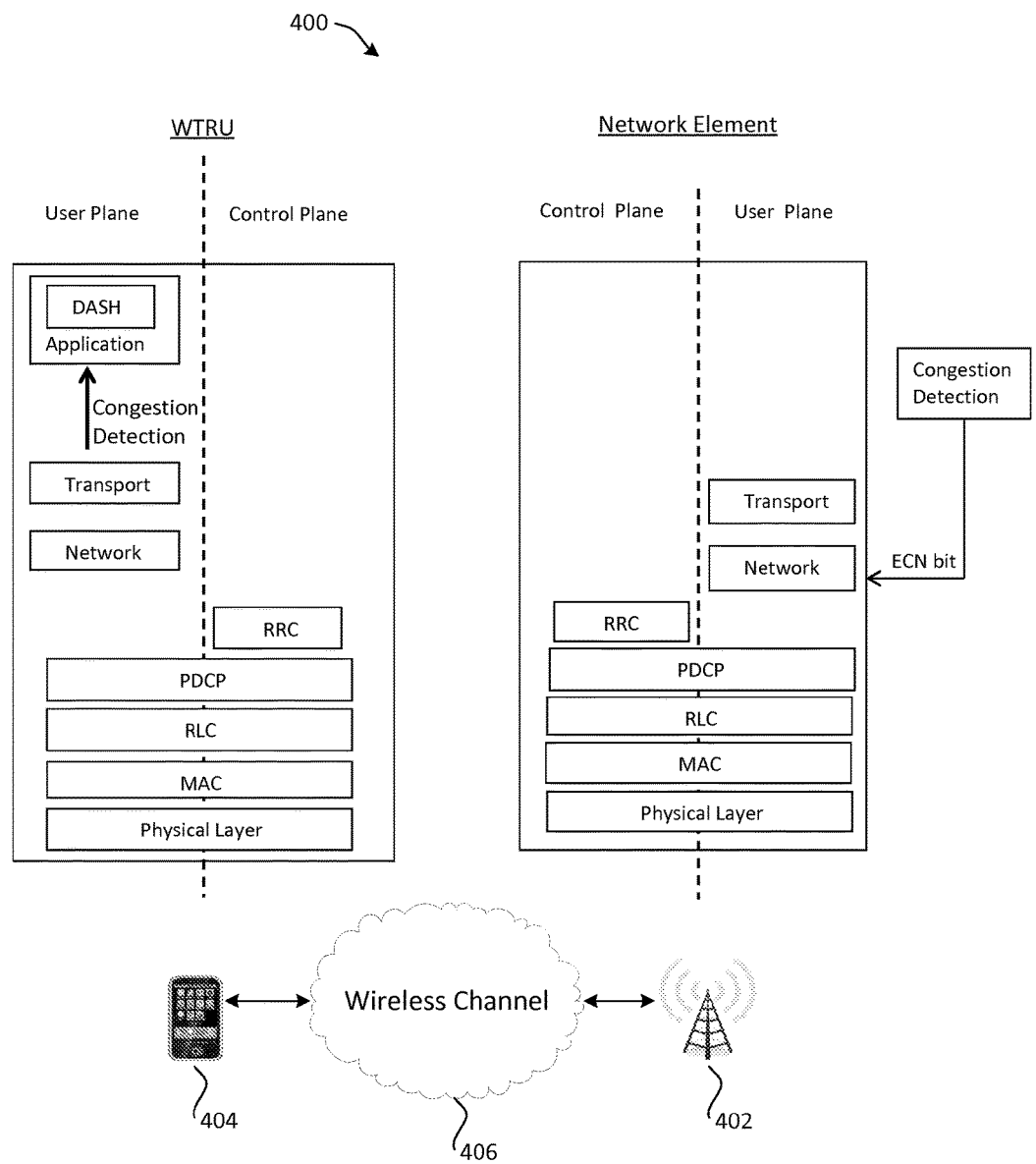
FIG. 4 is a diagram illustrating an example of an ECN bit that may be set by a network element and used by a WTRU for rate adaptation.

FIG. 4 is a diagram illustrating an example of an ECN bit that may be set by a network element (e.g., an eNodeB) and used by a WTRU for rate adaptation. The diagram 400 may be from a protocol stack perspective. A network element 402 (e.g., an eNodeB) may be configured to detect congestion on a communication channel 406 between it and a WTRU 404. The network element 402 may be configured to set a CE bit of the ECN field to indicate the presence of network congestion. The network element 402 may transmit the CE bit to the WTRU 404. The WTRU 404 may receive the CE bit. The WTRU 404 may pass the CE bit up to the application layer, for example, to a DASH client residing at the application layer of the WTRU 404. The DASH client may interpret the CE bit and perform rate adaption accordingly.

Figure 5:
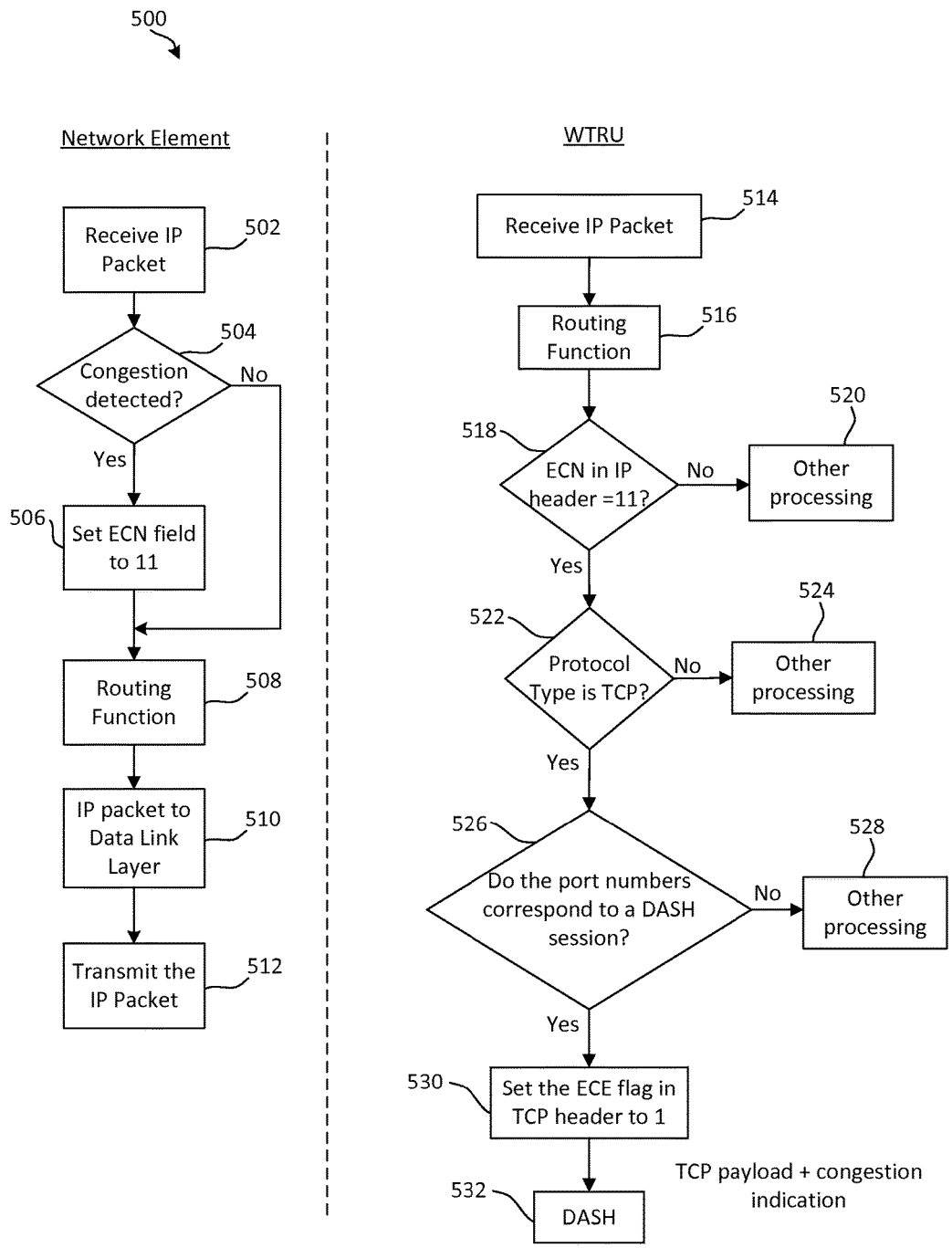
FIG. 5 is a flow diagram illustrating an example procedure for a network element to set the ECN bit and for a WTRU to perform rate adaptation.

FIG. 5 is a flow diagram illustrating an example procedure for a network element (e.g., an eNodeB, router, gateway, etc.) to set the ECN bit and for the WTRU (e.g., a DASH client residing on the WTRU) to perform rate adaptation. In the procedure 500, the network element may receive an IP packet at 502. At 504, the network element may determine whether or not congestion is detected. If network congestion is detected, then the network element may set the CE bit of the ECN field, for example, so that the ECN field is set to 11. At 508, the network element performs one or more routing functions (e.g., pass the IP packet down the protocol stack). At 510, the network element transmits the IP packet to the data link layer. At 512, the network element may transmit the IP packet.

At 514, the WTRU may receive the IP packet, for example, via the data link layer. At 516, the WTRU may perform one or more routing functions (e.g., pass the IP packet up the protocol stack to the application layer). At 518, the WTRU may determine whether the ECN field of the IP packet is set to 11. If not, then the WTRU may perform other processing at 520. If the ECN field of the IP packet is set to 11, then the WTRU may determine whether the protocol type is TCP at 522. If the protocol type is not TCP then the WTRU may perform other processing at 524. If the protocol type is TCP, then the WTRU may determine whether the port numbers correspond to a DASH session at 526. If not, then the WTRU may perform other processing at 528. If the port numbers do correspond to a DASH session, then the WTRU may set the ECE flag in the TCP header to 1 at 530. At 532, the WTRU, for example, the DASH client, may read the ECE flag and perform rate adaption accordingly.

Rate adaptation using physical layer parameters may be described herein. If ECN is not supported by the network, a WTRU (e.g., a client) may perform rate adaptation using a physical layer parameter(s) and/or a MAC layer parameter (s), for example, a Channel Quality Indicator (CQI), a number of Physical Resource Blocks (PRBs) assigned to the WTRU, and/or an amount of requested data that has not yet been delivered to the WTRU (e.g., an application residing on the WTRU). A WTRU may have access to a CQI. For example, the WTRU may generate the CQI and/or the number of PRBs that it has been allocated. The WTRU may generate the CQI and/or the number of PRBs that it has been allocated by monitoring a physical downlink control channel (PDCCH).

A WTRU (e.g., a client) may calculate the estimated physical layer throughput obtained over a time scale of interest. For example, $t_{dash}$ may represent the time interval between two successive requests of the WTRU (e.g., 'HTTP GET' requests) for rate adaptation. The WTRU may monitor the trend of the estimated physical layer throughput (e.g., using the CQI and/or the allocated PRBs) over a time scale that is smaller than $t_{dash}$, for example, together with the amount of data that the WTRU may have requested (e.g., the amount of data that the client requested may be obtained from the segment size) to estimate the congestion level of the network and/or weak downlink conditions.

Figure 6:
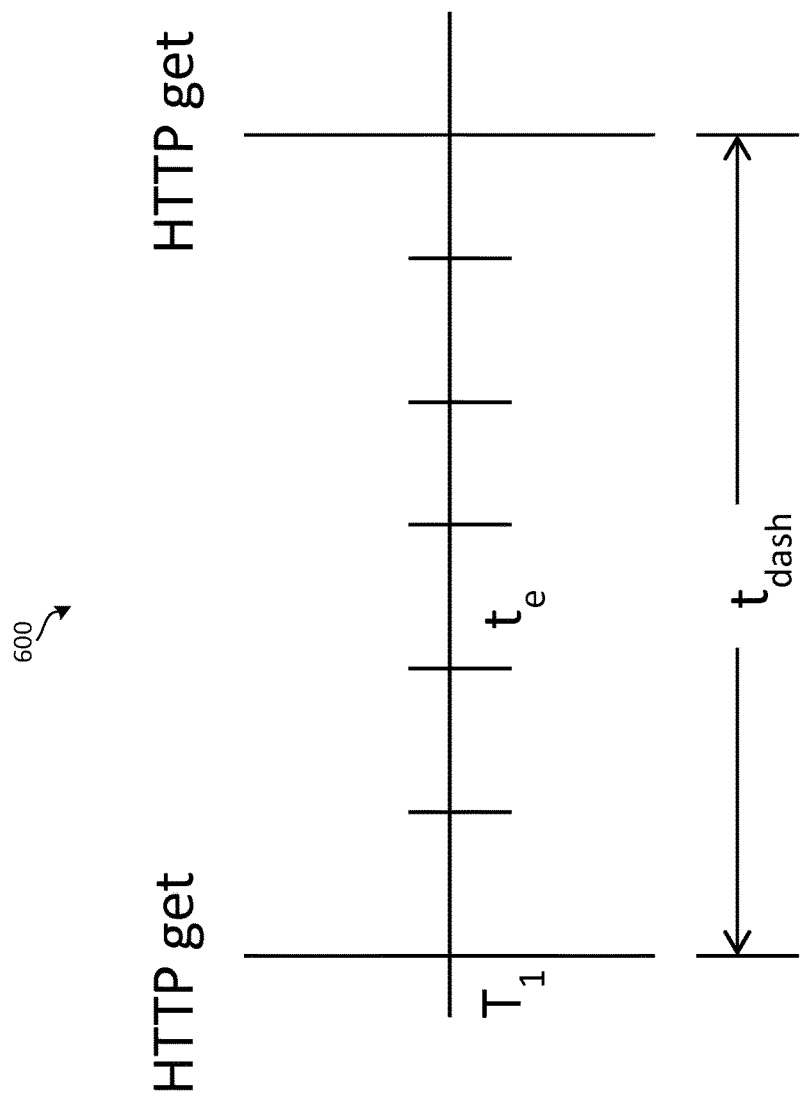
FIG. 6 is a diagram illustrating an example of a time lines for client rate adaptation and estimate throughput.

FIG. 6 is a diagram illustrating an example of a timeline for client rate adaptation and estimated throughput. Graph 600 is an example timeline that illustrates the time between HTTP GET requests of a WTRU. For example, if the WTRU (e.g., client) issues a HTTP GET request at time $T_1$, then the next request from the WTRU may go out at $T_1+t_{dash}$. The segment size of HTTP GET request may be larger than a requested segment size. For example, whenever the client issues a request of segment size, there may be enough data in the transmit buffer in the network element (e.g., eNodeB) for the WTRU.

The WTRU may estimate the throughput of the channel. For example, the estimated throughput over a time duration of $$t_e = \left(\frac{1}{N}\right) t_{dash},$$

where N may be chosen such that it is neither small, nor large (e.g., N may signify the granularity level with which the physical layer throughputs may be estimated) may be calculated. The physical layer throughputs may be estimated at times: $T_1$, $T_1+t_e$, $T_1+2\ t_e$, ... $T_1+(N-1)\ t_e$.

The trend in estimated throughputs obtained may be observed and utilized by a WTRU to estimate channel throughout. If there is a decreasing trend in the estimated throughput (e.g., due to network congestion and/or due to weak downlink conditions, since the WTRU may have requested enough data at time $T_1$) during time interval $[(T_1+(N-4)t_e), (T_1+(N-2)t_e)]$, then the WTRU (e.g., DASH client) may determine the appropriate rate adaptation before it requests new rates at time $T_1+t_{dash}$. By looking at the physical layer throughputs (e.g., which may be indicative of the application layer throughput) at a finer granularity than what may be observed by the client application, the WTRU (e.g., client) may determine potential network congestion and/or weak channel conditions, for example, before the client sends out a new request.

The estimated throughout over time interval $t_e$ may be determined, for example, as provided herein. nPRB may be the total number of physical resource blocks that carry WTRU data. $RB_i$ may denote the $i^{th}$ physical resource block. $CQI_i$ may be the Channel Quality Indicator in $PRB_i$. TBS may represent a vector of transport block size that corresponds to possible CQI. For example, in LTE there may be 28 possible CQI values and a transport block size may correspond to each CQI. $TBS(CQI_i)$ may represents the transport block size corresponding to $CQI_i$. The estimated throughput over a time interval $t_e$ may be:

$$\text{Estimated throughput} = \left(\frac{1}{t_e}\right) \sum_{i}^{nPRB} TBS(CQI_i)$$

RRC signaling may be used by a WTRU to perform rate adaptation. RRC signaling may occur between the WTRU and the network element, for example, where the WTRU may report the status of mobility, received signal power, weak downlink conditions to the network, and/or the like. RRC signaling may be used to predict the occurrence of an event (e.g., from the measurement report message (MRM)) that the WTRU may signal to a network element (e.g., an eNodeB). The MRM may be fed back to the DASH rate adaptation module. An example of may be provided FIG. 7.

Figure 7:
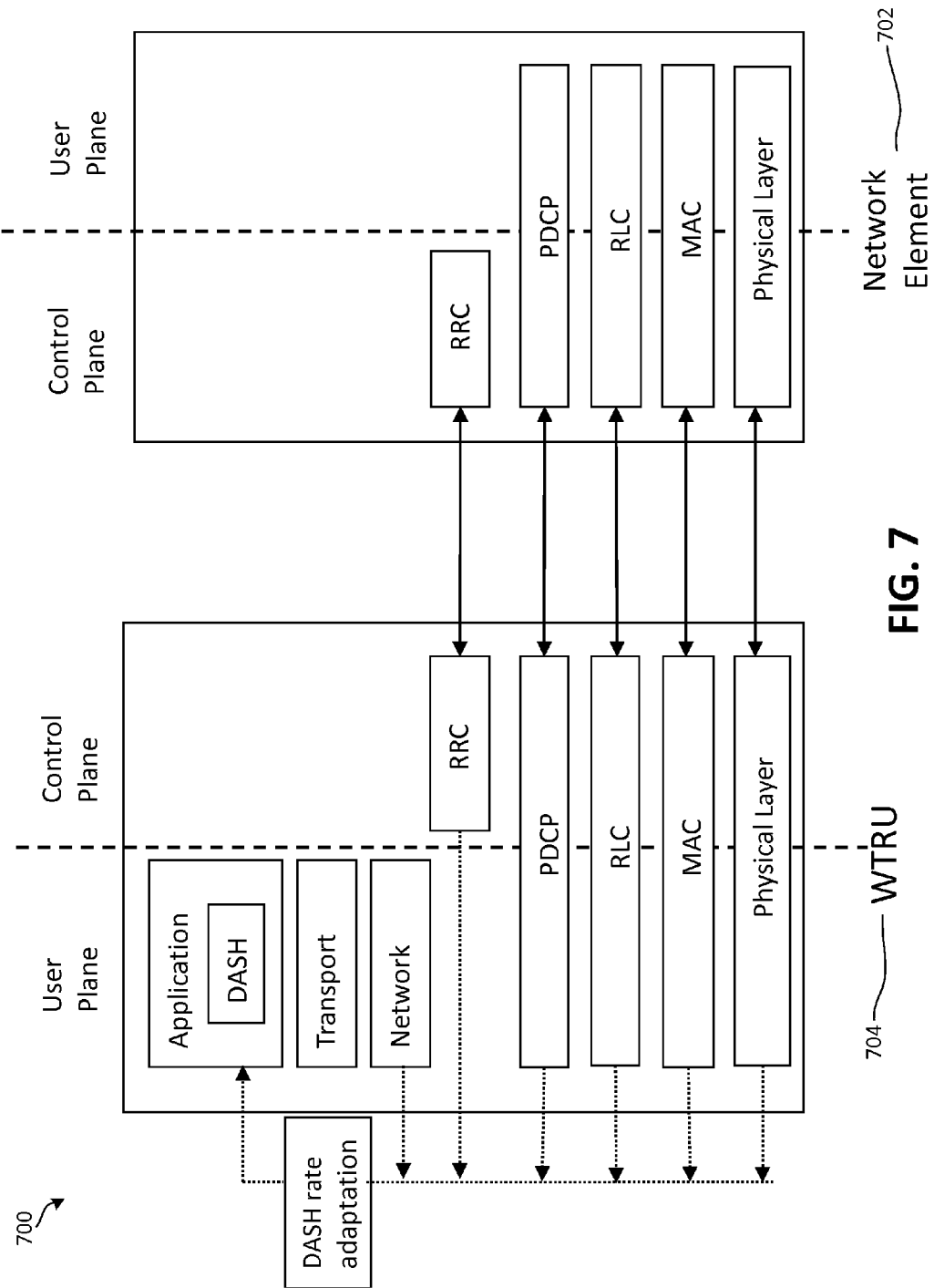
FIG. 7 is a diagram illustrating an example of cross-layer DASH rate adaptation.

FIG. 7 is a diagram illustrating an example of cross-layer DASH rate adaptation. The diagram 700 may be from a protocol stack perspective. A network element 702 (e.g., an eNodeB) may be in communication with a WTRU 704. The WTRU may determine (e.g., measure and/or estimate) network conditions. The WTRU 704 may include a DASH client, which may, for example, reside at the application layer of the WTRU 704. The WTRU may perform rate adaption, for example, as described herein. For example, the DASH client residing at the application layer of the WTRU may perform rate adaption. For example, rate adaption may be performed based on one or more cross-layer (e.g., lower layer) parameters, such as, but not limited to network layer parameters, RRC layer parameters, RLC layer parameters, MAC layer parameters, physical layer parameters, transport layer parameters, or the like.

The WTRU 704 may be connected to a cellular network. The WTRU 704 may encounter a cell change event, such as a mobility event, for example. The change cell event may trigger the WTRU 704 to perform rate adaption. For example, the WTRU 704 may be streaming video while connected to an LTE/LTE-Advanced cell. Due to network coverage and/or WTRU mobility, conditions may necessitate that the WTRU 704 hands over to 3G or 2G. The hand over from LTE to 3G/2G, (e.g., or from 3G to 2G; e.g., from a higher to lower capability access technology) may have a detrimental effect on video streaming due to decrease in capacity. While handover may provide a short term boost in throughput, handover from LTE to 2G/3G may lower the peak achievable throughput. The effect of video streaming may suffer the greatest during the handover (e.g., when the handover is in progress) when the DASH client has not yet adapted to the network.

A WTRU may deliver a Measurement Report Message (MRM) to the network element (e.g., eNodeB), for example, in response to measurement control messages that are sent by the network element to the WTRU. The MRM may be fed to the DASH client (e.g., DASH rate adaptation module) residing on the WTRU, for example, before the handover process is initiated.

The WTRU may perform rate adaption during a cell change event, such as a handover, for example. For example, for 3G to 2G handover, the MRMs that may be used as events before a 3G to a 2G handover and which may be signaled to the DASH client for rate adaptation may comprise, event 3c, event 2d, and event 3a. For event 3c, the estimated quality of the other system's frequency may be above a threshold. For event 2d, the estimated quality of the currently used frequency may be below a threshold. For event 3a, the estimated quality of the currently used UTRAN frequency may be below a threshold and the estimated quality of the other system's frequency may be above a threshold.

Figure 8:
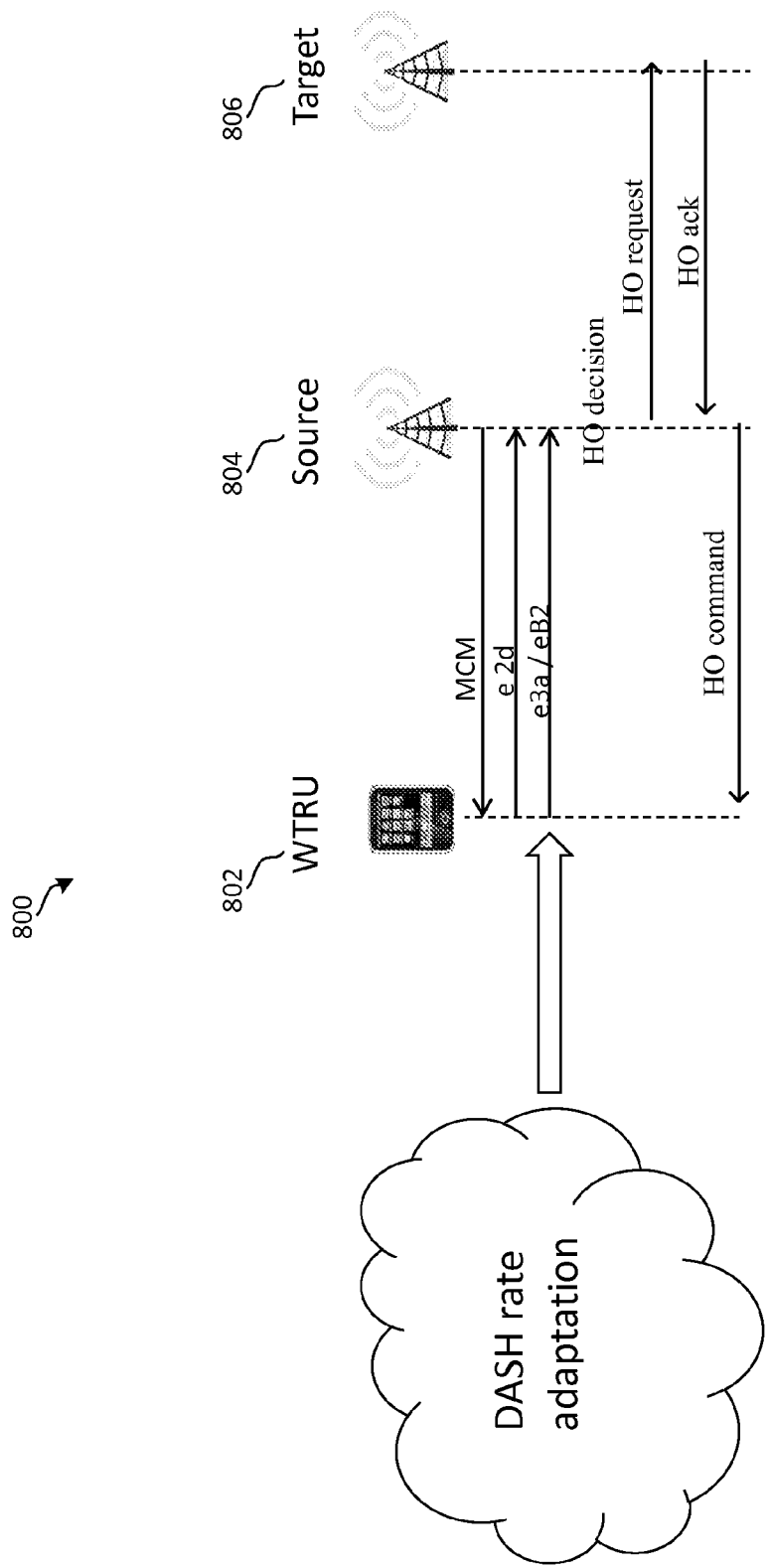
FIG. 8 is a diagram illustrating an example use of Radio Resource Control (RRC) signaling for client rate adaptation.

FIG. 8 is a diagram illustrating an example use of RRC signaling for client rate adaptation. The diagram 800 may include a WTRU 802 that may be in communication with a source 804, which may be in communication with a target 806. The WTRU 802 may perform rate adaption during a cell change event, for example, as described herein. The WTRU 802 may be in communication with the source 804. The source 804 may be in communication with the target 806. The WTRU may change cells from a cell of the source 804 to a cell of the target 806, for example, due to mobility, network congestion, and/or the like. The source 804 and/or the network element may be a network element (e.g., eNodeB, router, gateway, or the like). The source 804 and/or the target 806 may refer to cells. The source 804 and the target 806 may be two cells that are part of the same network element (e.g., eNodeB) or different network elements.

A DASH rate adaptation module may reside in the WRTU 802. A handover command ("HO command" in diagram 800) may be issued at the end of the process by the source 804 to the WTRU 802. One or more events not illustrated may occur before the HO command is received by the WTRU 802. For example, the source 804 may transmit a Measurement Control Message to the WTRU 802. The WTRU 802 may transmit Event 2D (e2d) and/or Event 3A/Event B2 (e3a/eB2) to the source 804. This source 804 may determine to handover the WTRU 802 to the target 806. The source 804 may transmit a HO request to the target 806.

The target 806 may transmit a HO acknowledgement to the source 804. The source 804 may transmit a HO command to the WTRU 802. As such, the WTRU 802 may be handed over to the target 806.

The call flow of diagram 800 (e.g., partially or in its entirety) may be used to perform rate adaptation. For example, rate adaption may begin when the WTRU receives e3a, for example, because the quality of the used frequency may be below a certain threshold, the quality of target system's frequency may be above a certain threshold, or the like. Signaling that indicates that a cell/handover may be imminent may be used to perform rate adaption, for example, before the cell/handover actually occurs. For example, signaling that indicates that a cell/handover may be imminent may indicate a likely change in capacity, which may prompt the WTRU 802 to perform rate adaption. Performing rate adaption based on cross layer signaling (e.g., RRC signaling) may be quicker than the WTRU 802 waiting to receive the HO command and then relying on the transport protocol to initiate rate adaptation.

For an LTE 3G/2G handover, for example, event B1 may signify that a neighbor cell's radio link quality on a different RAT has become better than a threshold. Event B2 may signify that a serving cell radio quality has become worse than a threshold and/or the neighbor cell's radio link quality on a different RAT has become better than a threshold. A handover command may be issued by the network element (e.g., eNodeB) after one or more events are reported by the WTRU. The events may be fed back to signal a decrease in capacity, for example, that may be caused by the handover to the DASH client before the handover command is issued by the network element to the WTRU. For example, once e3a is triggered by the WTRU, the WTRU may perform rate adaption. For example, the DASH client rate adaptation module of the WTRU may be informed that e3a is triggered and perform rate adaption accordingly. Even if e3a is triggered, the network element may not be able to handover, for example, due to cell loading, admission control, etc. The RRC signaling messages that the serving network element issues and/or that the WTRU triggers may be followed based on the serving cell conditions, and the client rate may be adapted accordingly (e.g. without causing any detrimental effect).

A WTRU may perform rate adaption in response to receiving a weak cell indication. The WTRU may receive events that may be indicative of a weak cell (e.g., weak signal strength received from the cell or the like). For example, one or more events may be fed back to the WTRU. The events may occur before packet errors that might occur due to the signal strength from the serving cell falling below a threshold. Event A2, event 1f, and event 2d may be MRMs that may be used by a WTRU for rate adaptation. For event A2 (e.g., Intra-frequency reporting in LTE), the serving cell radio link quality may become worse than a threshold. For event 1f (e.g., Intra-frequency reporting event in 3G), a primary CPICH may become worse than a threshold. For event 2d (e.g., Inter-frequency reporting event in 3G), the estimated quality of the currently used frequency may be below a threshold. The events may be proactively fed back to the WTRU to signal a likelihood of impending poor downlink conditions, which may cause packet losses. The WTRU (e.g., a DASH client rate adaptation module) may receive the events prior to an actual throughput decrease. The WTRU may perform rate adaption before any decrease in throughout.

A WTRU may perform rate adaption as described herein. The WTRU may include an adaptive bitrate client, such as a DASH client, for example, residing at the application layer of the WTRU. For example, the WTRU may include a rate adaption module of a DASH client that resides on the WTRU. The WTRU may receive an encoded data stream. The data stream may be a video stream, for example. The data stream may be a multi-rate encoded data stream. For example, the data stream may be encoded according to a Dynamic Adaptive HTTP Streaming (DASH) standard. The WTRU may request and/or receive the data stream encoded at a first rate. For example, the WTRU may request and/or receive (e.g., indirectly receive) the data stream from a content server, such as a HTTP content server, or the like.

The WTRU may perform rate adaption, for example, according a cross-layer parameter and/or a congestion encountered (CE) bit. Rate adaption may be performed at the application layer of the WTRU. For example, rate adaption may refer to a process of determining to request the data stream encoded at a different rate based on one or more variables, such as the channel conditions. For example, a DASH adaption rate module of the WTRU may perform the rate adaption for the encoded video stream. For example, rate adaption may include requesting the data stream encoded at a different rate, issuing TCP reset associated with the data stream, and/or aborting an HTTP request for the data stream. The WTRU (e.g., DASH client) may include guidelines for performing rate adaptation, whereby the cross-layer parameter(s) may be used to determine whether or not the WTRU should perform rate adaptation.

The WTRU may monitor and/or receive a cross-layer parameter. A cross-layer parameter may be any parameters (e.g., signaling) that is directed to a layer of the WTRU other than the application layer. For example, the cross-layer parameter may be a physical layer parameter, a RRC layer parameter, and/or a MAC layer parameter. For example, the cross-layer parameters may be a CQI, a PRB allocation, a MRM, or the like.

The WTRU may perform rate adaption based on the cross-layer parameter. For example, the WTRU may set the CE bit of an Explicit Congestion Notification (ECN) field based on the cross-layer parameter. The WTRU may set and/or receive a CE bit of an ECN field based on the cross-layer parameter. The WTRU may predict (e.g., estimate) one or more of network congestion, throughout of the communication channel, a cell change event (e.g., a mobility event), and/or a channel condition that indicates loss of throughput using the cross-layer parameter. For example, the WTRU may determine to request the data stream encoded at a second rate based on one or more of the cross-layer parameter, the CE bit, and/or the prediction based on the cross-layer parameter. The second rate may be lower than the first rate or the second rate may be higher than the first rate. The WTRU may receive the data stream encoded at the second rate.

The WTRU may receive a data stream. The date stream may be encoded at a first rate. The WTRU may receive a congestion encountered (CE) bit. The CE bit may be part of an ECN field. The ECN field may be received from a network element, such as a router, eNodeB, gateway, or the like. The WTRU may receive the CE bit upon a network element detecting one or more of a congestion scenario, a cell change event (e.g., a mobility event), and/or a channel condition that indicates loss of throughput.

The WTRU may determine to request the data stream encoded at a second rate based on the CE bit. The WTRU may not transmit an ECN-Echo (ECE) bit set to a sender after receiving the CE bit. The second rate may be lower than the first rate or may be higher than the first rate. The WTRU may request the data stream encoded at the second rate, for example, from a content server. The WTRU may receive the data stream encoded at the second rate from a content server.

The WTRU may receive the data stream encoded at the first rate. The WTRU may monitor a PDCCH and determine a physical layer parameter based on the PDCCH. For example, the physical layer parameter may include a CQI, a PRB allocation, or the like. The WTRU may determine to request the data stream encoded at a different rate based on the physical layer parameter. For example, the WTRU may set the CE bit of an ECN field based on the physical layer parameters, and determine to request the data stream encoded at the different rate based on the CE bit. The WTRU may request and/or receive the data stream encoded at a different rate.

Figure 9:
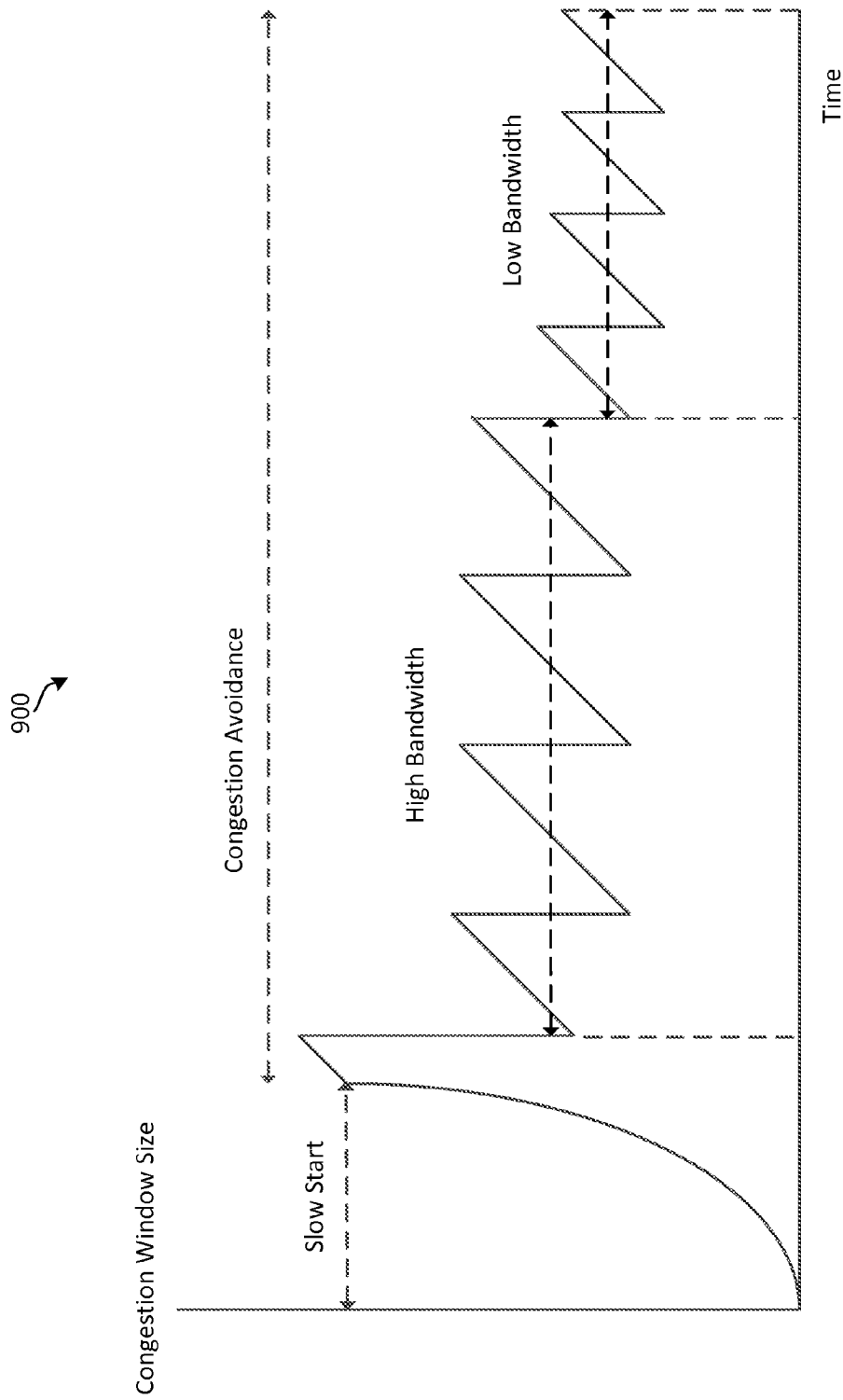
FIG. 9 is a diagram illustrating an example of Transmission Control Protocol (TCP) congestion window size behavior vs. time.

The available bandwidth of a communication channel may be estimated by a WTRU (e.g., a DASH client) to reduce the estimation error. FIG. 9 is a diagram illustrating an example of TCP congestion window size behavior vs. time. The diagram 900 may illustrate how the congestion window size evolves in a typical TCP connection. For example, the TCP throughput may be approximately equal to (¾)W*MSS/RTT, where W may be the congestion window size in Maximum Segment Size (MSS) and RTT may be the round trip time. When in the congestion avoidance phase, the congestion window size may increase by 1 MSS every RTT. If there is an abrupt change in the available bandwidth, then it may take TCP Win/2 RTTs to learn the new bandwidth, where Wm may be the maximum congestion window size.

If other means are used to inform the WTRU (e.g., the DASH Client) of the changes in the available bandwidth, the delay in the DASH rate adaptation may be reduced. For example, if ECN is used at the base station, then the delay may be reduced to approximately the order of 1 RTT. For example, if physical layer information collected at the WTRU is used, the delay may be reduced to approximately the order of 1 TTI.

Figure 10:
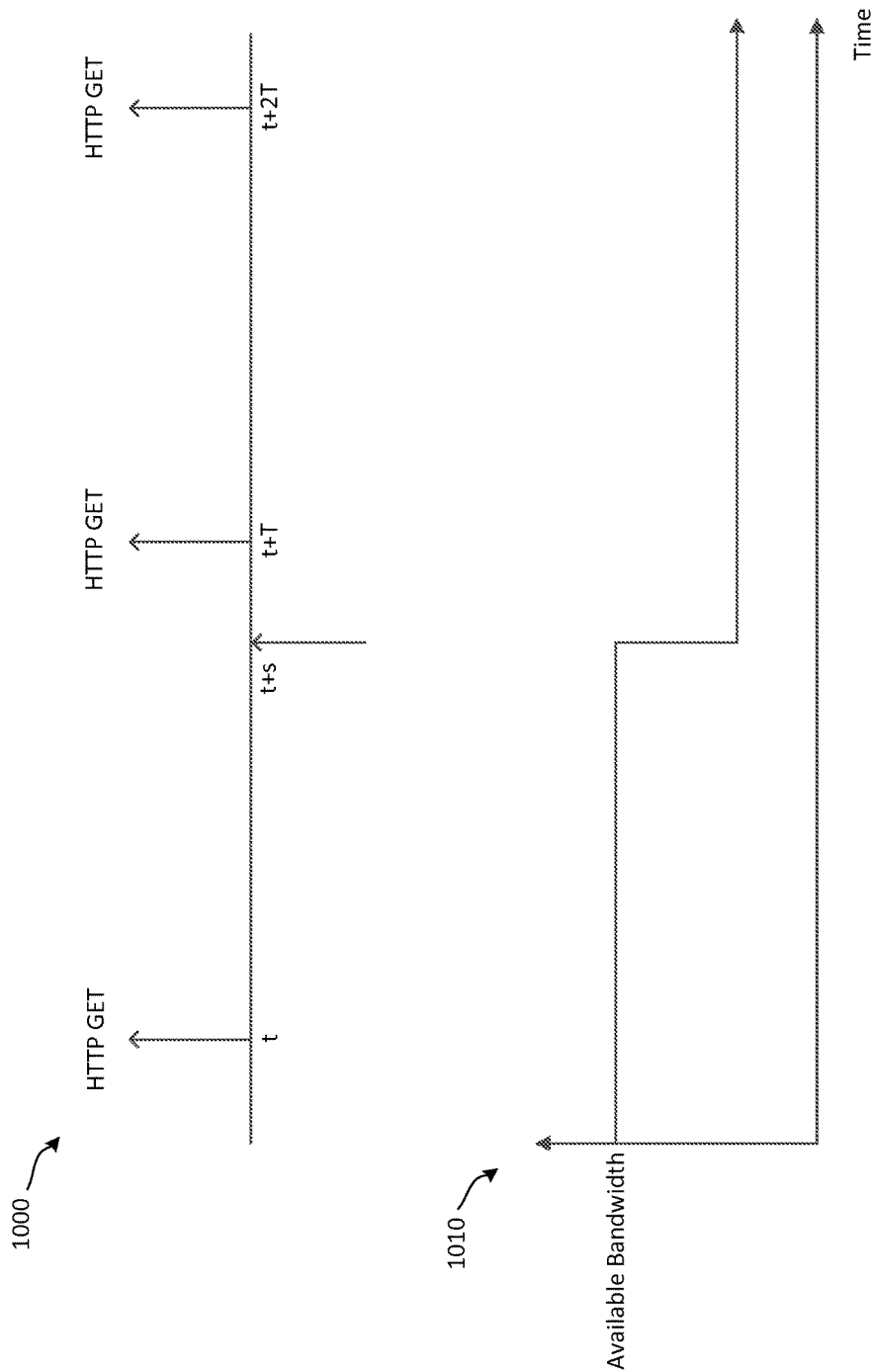
FIG. 10 is a diagram illustrating example timing of Hypertext Transfer Protocol (HTTP) GET requests and available bandwidth vs. time.

FIG. 10 is a diagram illustrating example timing of HTTP GET requests and available bandwidth vs. time. The diagram 1000 may illustrate an example timing of HTTP GET request. The diagram 1010 may illustrate an example timing of the available bandwidth vs. time, for example, with respect to the HTTP GET requests of diagram 1000. For example, the time interval between consecutive HTTP GET requests may be T sec. The available bandwidth may drop at time t+s sec, due to, for example, handover or shadowing. If T−s is shorter than (Wm/2)*RTT, then TCP may not be able to accurately estimate the new available bandwidth, and may request a media segment of a high rate. This may increase the probability of rebuffering. If T−s is longer than (Wm/2)*RTT, then TCP may be able to learn the new available bandwidth accurately.

For example, the old available bandwidth may be R1, the new available bandwidth may be R2, and R2=αR1, where 0<α<1. The maximum congestion window sizes may be Wm1 and Wm2, respectively. Then, Wm2=αWm1.

Figure 11:
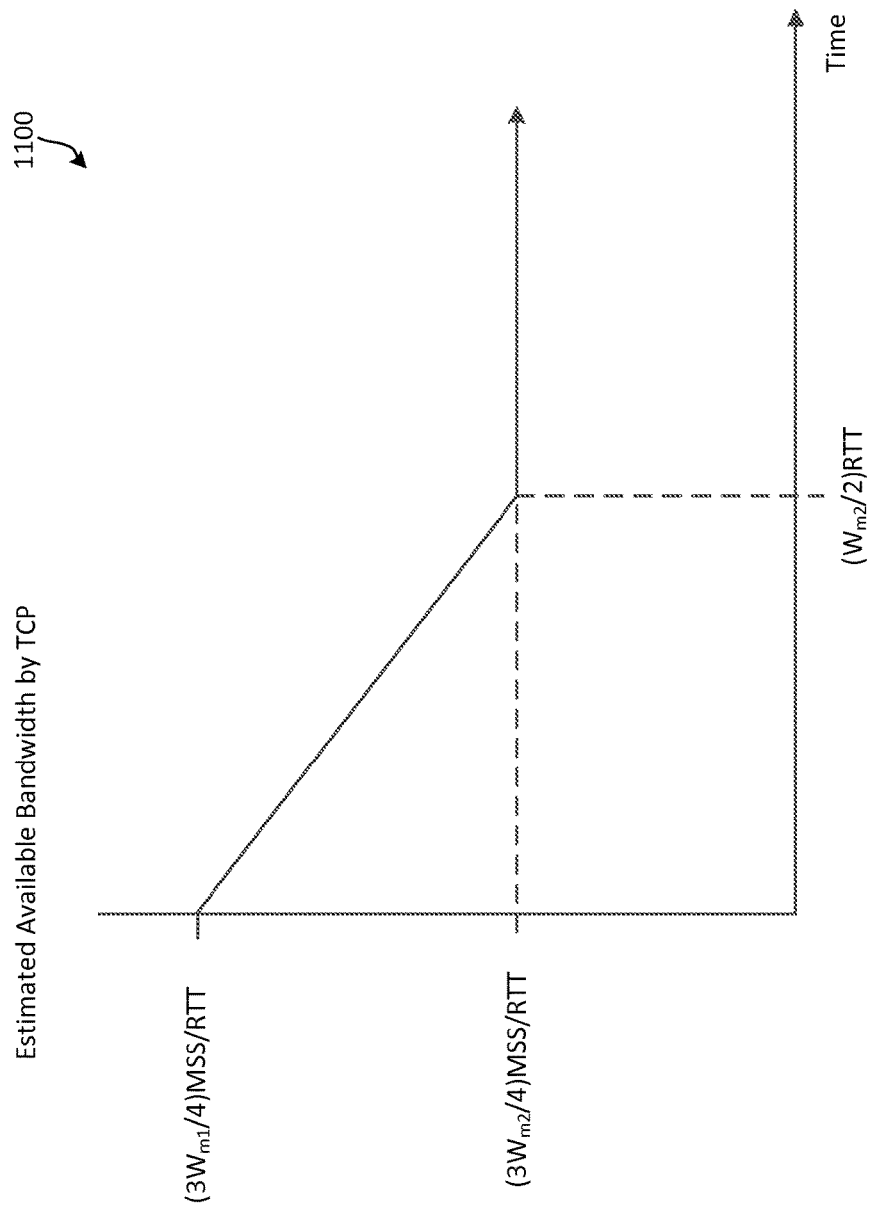
FIG. 11 is a diagram illustrating an example of the estimated available bandwidth by TCP as a function of time.

FIG. 11 is a diagram 1100 that illustrates an example of the estimated available bandwidth by TCP as a function of time. The average inaccuracy of TCP's available bandwidth estimation may be calculated by a WTRU (e.g., a client residing on the WTRU). Assuming that t+s may be uniformly distributed in the time interval [t, t+T], the average estimation error for TCP (where x=T−s) may be:

$$E[error_{TCP}] = \int_0^{\left(\frac{W_{m2}}{2}\right)RTT} \frac{1}{T} \frac{3}{4RTT}(W_{m1} - W_{m2})MSS\left(1 - \frac{x}{\left(\frac{W_{m2}}{2}\right)RTT}\right)dx$$

$$= \frac{\alpha(1-\alpha)W_{m1}RTT}{4T}R_1$$

The WTRU may estimate the available bandwidth, and may use the estimated available bandwidth to perform rate adaption. For example, the time that it takes for the WTRU to estimate the available bandwidth may be U. The average estimation error for an estimation implementation may be:

$$E[error] = \frac{(1-\alpha)U}{2T}R_1$$

If U<(W$_{m2}$/2)RTT, then the estimation implementation described herein may have better accuracy than the estimation error for TCP. For example, Wm2=20, RTT=300 ms, and MSS=512 bytes. This may correspond to an average throughput of 204.8 kbps. For example, U=500 TTIs. Then, U/((W$_{m2}$/2)RTT)=⅙. The estimation error may be reduced by a factor of 6 using the estimation implementation described herein.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, WTRU, terminal, base station, RNC, and/or any host computer.

What is claimed is:

1. A wireless transmit/receive unit (WTRU) configured to perform rate adaption, the WTRU comprising:
   a processor configured to:
      receive a data stream encoded at a first rate;
      set a congestion encountered (CE) bit of an Explicit Congestion Notification (ECN) field based on a cross-layer parameter;
      determine to request the data stream encoded at a second rate based on the CE bit; and
      request the data stream encoded at the second rate.

2. The WTRU of claim 1, wherein the determination to request the data stream encoded at the second rate based on the CE bit is performed at an application layer of the WTRU.

3. The WTRU of claim 1, wherein the processor is further configured to:
   predict a change in throughput using the cross-layer parameter; and
   determine to request the data stream encoded at the second rate based on the prediction.

4. The WTRU of claim 1, wherein the cross-layer parameter is a physical layer parameter, and the processor is further configured to:

monitor a physical downlink control channel (PDCCH); and determine the physical layer parameter by monitoring the PDCCH.

5. The WTRU of claim 1, wherein the cross-layer parameter is a physical layer parameter, a Radio Resource Control (RRC) layer parameter, or a Media Access Control (MAC) layer parameter.

6. The WTRU of claim 1, wherein the cross-layer parameter is a Channel Quality Indicator (CQI).

7. The WTRU of claim 1, wherein the cross-layer parameter is a physical resource block (PRB) allocation.

8. The WTRU of claim 1, wherein the cross-layer parameter is a measurement report message (MRM).

9. The WTRU of claim 1, wherein the cross-layer parameter is an amount of requested data that has not been received by the WTRU.

10. The WTRU of claim 1, wherein the data stream is encoded according to a Dynamic Adaptive HTTP Streaming (DASH) standard.

11. A method of performing rate adaptation with a wireless transmit/receive unit (WTRU), the method comprising:
receiving a data stream encoded at a first rate;
receiving a cross-layer parameter;
predicting a change in throughput using the cross-layer parameter;
determining to request the data stream encoded at a second rate based on the prediction; and
requesting the data stream encoded at the second rate.

12. The method of claim 11, wherein the cross-layer parameter is a physical layer parameter, the method further comprising:
monitoring a physical downlink control channel (PDCCH); and
determining the physical layer parameter by monitoring the PDCCH.

13. The method of claim 11, wherein the cross-layer parameter is a physical layer parameter, a Radio Resource Control (RRC) layer parameter, or a Media Access Control (MAC) layer parameter.

14. The method of claim 11, wherein the cross-layer parameter is a Channel Quality Indicator (CQI).

15. The method of claim 11, wherein the cross-layer parameter is a physical resource block (PRB) allocation.

16. The method of claim 11, wherein the cross-layer parameter is a measurement report message (MRM).

17. The method of claim 11, wherein the cross-layer parameter is an amount of requested data that has not been received by the WTRU.

18. The method of claim 11, wherein the data stream is encoded according to a Dynamic Adaptive HTTP Streaming (DASH) standard.

19. A method of performing rate adaptation with a wireless transmit/receive unit (WTRU), the method comprising:
receiving a data stream encoded at a first rate, the data stream being encoded according to a Dynamic Adaptive HTTP Streaming (DASH) standard;
monitoring a physical downlink control channel (PDCCH);
determining a physical layer parameter by monitoring the PDCCH;
determining to request the data stream encoded at a second rate based on the physical layer parameter, the second rate being less than the first rate; and
requesting the data stream encoded at the second rate.

20. The method of claim 19, further comprising:
receiving a congestion encountered (CE) bit of an Explicit Congestion Notification (ECN) field; and
determining to request the data stream encoded at the second rate based on the CE bit and the physical layer parameter.

21. The method of claim 20, wherein the data stream encoded at the first rate comprises the CE bit of the ECN field.

22. The method of claim 19, further comprising:
predicting a change in throughput using the physical layer parameter; and
determining to request the data stream encoded at the second rate based on the prediction.

23. A method of performing rate adaptation with a wireless transmit/receive unit (WTRU), the method comprising:
receiving a data stream encoded at a first rate, the data stream being encoded according to a Dynamic Adaptive HTTP Streaming (DASH) standard;
receiving a physical resource block (PRB) allocation or a measurement report message (MRM);
determining to request the data stream encoded at a second rate based on the PRB allocation or the MRM, the second rate being less than the first rate; and
requesting the data stream encoded at the second rate.

24. The method of claim 23, further comprising:
receiving a congestion encountered (CE) bit of an Explicit Congestion Notification (ECN) field; and
determining to request the data stream encoded at the second rate based on the CE bit and at least one of the PRB allocation or the MRM.

25. The method of claim 24, wherein the data stream encoded at the first rate comprises the CE bit of the ECN field.

26. The method of claim 23, further comprising:
predicting a change in throughput using the PRB allocation or the MRM; and
determining to request the data stream encoded at the second rate based on the prediction.

* * * * *